S. W. LONGAN.
HOT WATER VESSEL.
APPLICATION FILED JAN. 10, 1910.

1,043,612.

Patented Nov. 5, 1912.

2 SHEETS—SHEET 1.

WITNESSES:
Edward Thorpe

INVENTOR
Silas Woodson Longan
BY Munn & Co
ATTORNEYS

S. W. LONGAN.
HOT WATER VESSEL.
APPLICATION FILED JAN. 10, 1910.
1,043,612.
Patented Nov. 5, 1912.
2 SHEETS—SHEET 2.
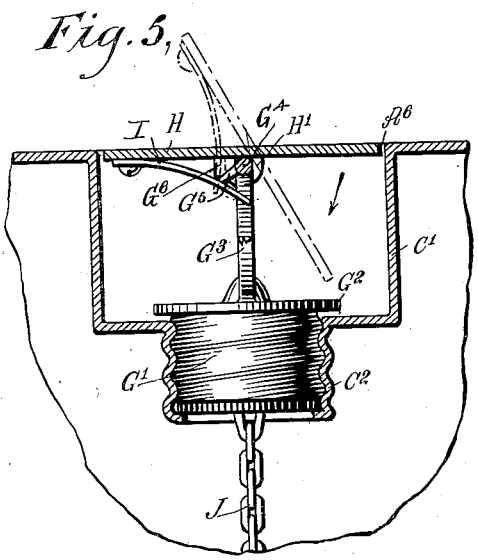
Fig. 5.
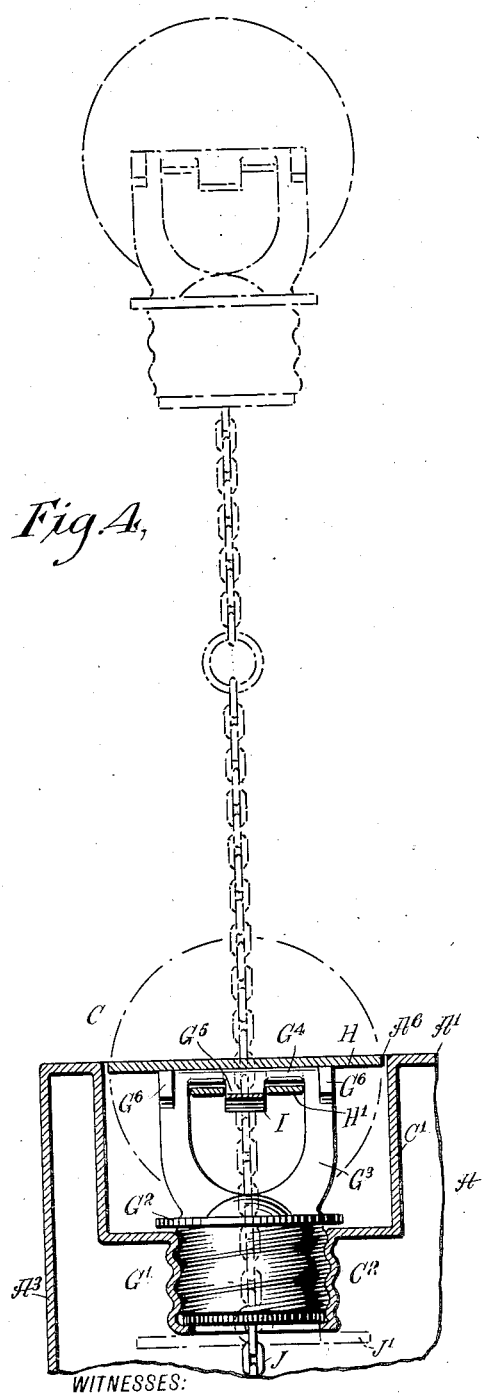
Fig. 4.
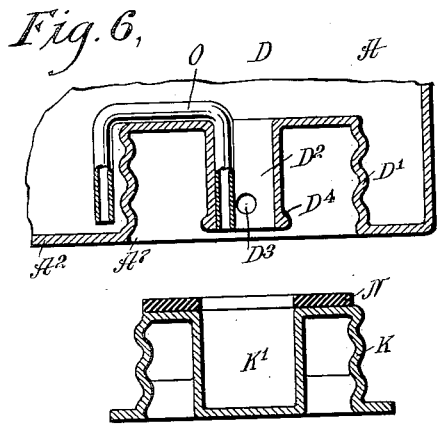
Fig. 6.
Fig. 7.
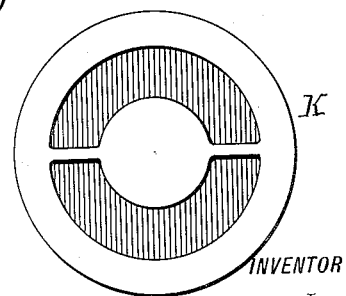
WITNESSES:
Edward Thorpe
Rev. J. Horwitz
INVENTOR
Silas Woodson Longan
BY Munn & Co
ATTORNEYS

UNITED STATES PATENT OFFICE.

SILAS WOODSON LONGAN, OF PARIS, KENTUCKY.

HOT-WATER VESSEL.

1,043,612.

Specification of Letters Patent. Patented Nov. 5, 1912.

Application filed January 10, 1910. Serial No. 537,182.

*To all whom it may concern:*

Be it known that I, SILAS WOODSON LONGAN, a citizen of the United States, and a resident of Paris, in the county of Bourbon and State of Kentucky, have invented a new and Improved Hot-Water Vessel, of which the following is a full, clear, and exact description.

The object of the invention is to provide a new and improved hot water vessel, arranged with non-flexible flat convex and concave surfaces, adapted to fit various parts of the human body and capable of giving off a graduated amount of heat, the vessel being arranged for use as an irrigator, by suspending the vessel and using the same as a tank connected with an irrigating tube to discharge the water under pressure onto a desired part of the body.

For the purpose mentioned, the vessel is made of a non-rusting metal, having a flat top, a flat bottom and convex and concave sides, the top and bottom being provided with filling and discharging devices, extending within the vessel, to leave the top and bottom surfaces uninterrupted.

A practical embodiment of the invention is represented in the accompanying drawings forming a part of this specification, in which similar characters of reference indicate corresponding parts in all the views.

Figure 1:
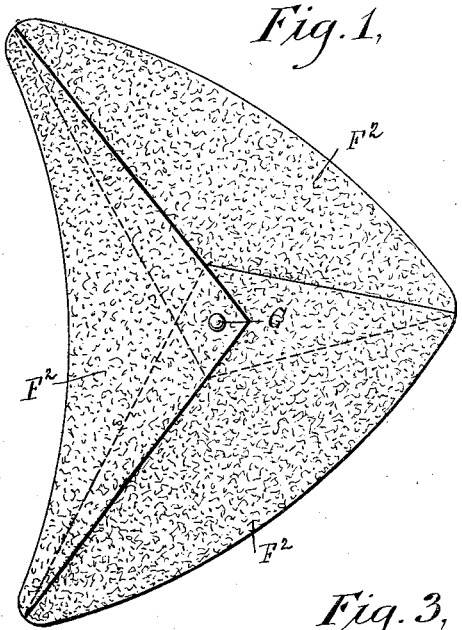
Figure 2:
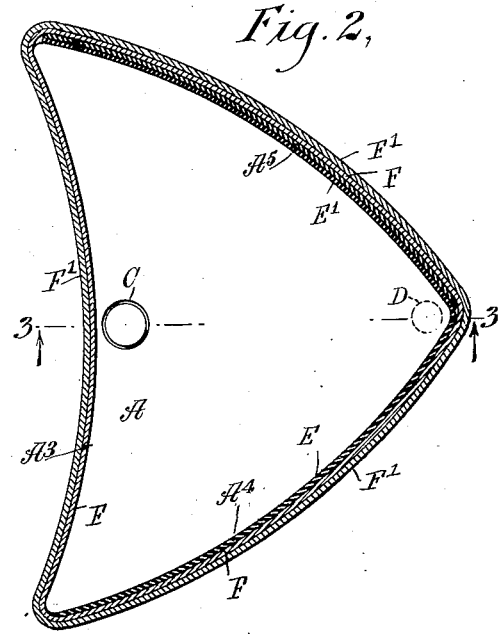
Figure 3:
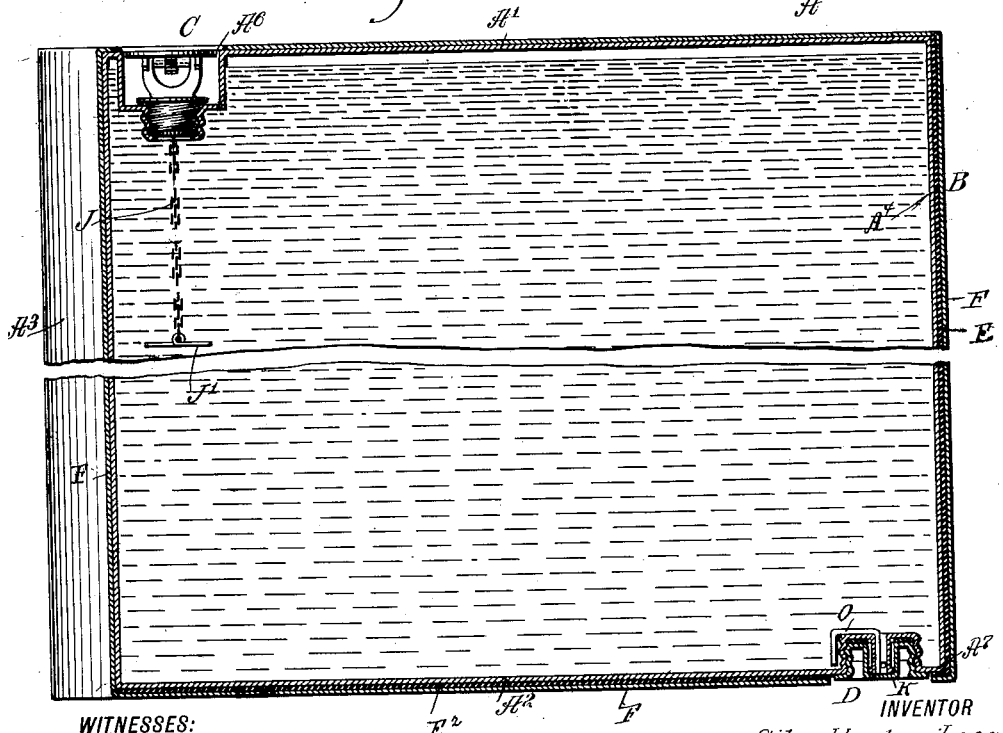

Figure 1 is a plan view of the hot water vessel; Fig. 2 is a plan view of the same, the covering being shown in section; Fig. 3 is an enlarged sectional side elevation of the same, on the line 3—3 of Fig. 2; Fig. 4 is an enlarged sectional side elevation of the filling device; Fig. 5 is a cross section of the same; Fig. 6 is an enlarged sectional side elevation of the discharging device, with the closing cap shown detached; and Fig. 7 is an inverted plan view of the closing cap.

The improved hot water vessel or bottle is provided with a hollow body A, preferably made of non-rusting metal, and the said vessel consists of a flat top $A'$, a flat bottom $A^2$, a concave side $A^3$ and convex sides $A^4$, $A^5$, which may be of the same or of different curvatures, as indicated in Fig. 2; that is, the curvature of the side $A^5$ may be more pronounced than that of the side $A^4$. In order to fill the hollow body A with hot or cold water B, chopped ice or the like, use is made of a filling device C connected with the top $A'$ of the hollow body A, and the said filling device C normally extends within the hollow body A, as plainly indicated in Fig. 3, and the bottom $A^2$ of the hollow body A is provided with a discharging device D, rising from the said bottom, to extend within the hollow body A. When the discharging device D is closed and the filling device C is open, then the hollow body A can be filled with water (hot or cold), chopped ice or the like, after which the filling device C is closed and the vessel is now applied with either the top $A'$, bottom $A^2$ or one of the sides $A^3$, $A^4$ or $A^5$ to the part of the human body to be subjected to the radiation of the heat emanating from the charge in the vessel.

In order to graduate the radiation of heat, use is made of a single layer of asbestos E, say applied to the side $A^4$, while two layers of asbestos $E'$ are applied to the side $A^5$ and the third side $A^3$ is without layers of asbestos. A layer of asbestos $E^2$ is preferably applied to the bottom $A^2$, as shown in Fig. 3. A covering F, of canvas or a like fabric material, incloses the body A to hold the layers E, $E'$ and $E^2$ in place, and over this covering F is placed an outer covering $F'$, of soft fabric material, and which forms a close fitting casing provided at the top with overlapping flaps $F^2$ (see Fig. 1) fastened together by suitable fastening devices G, to hold the outer covering firmly in place. Now by having the side $A^3$ without layers of asbestos, it is evident that the heat radiated at the side $A^3$ is of a higher temperature than the heat radiated through the side $A^4$ covered with a single layer of asbestos E, and the heat radiated through the side $A^5$ is of still less degree owing to the two layers of asbestos $E'$. Thus by using any one of the sides different degrees of heat are radiated to the afflicted part in contact with the corresponding side.

The detailed construction of the filling device C is as follows, special reference being had to Figs. 4 and 5: The casing $C'$ of the filling device C is soldered or otherwise secured to the top $A'$ so as to depend from the same around an opening $A^6$ formed in the top $A'$, and from the bottom of the casing $C'$ depends a threaded nipple $C^2$, in which screws a plug $G'$, provided at the top with a flange $G^2$ adapted to be seated on the upper surface of the bottom of the casing $C'$. From the top of the plug $G'$ rises a yoke $G^3$, provided with a pivot pin $G^4$, on which are fulcrumed lugs $H'$ depending from a closing disk H adapted to close the opening A⁶, as plainly indicated in Figs. 3, 4 and 5. A spring I is secured to the under side of the closing disk H, and presses with its free end on a lug G⁵ formed on a pivot pin G⁴, so that the closing disk H is normally held in a horizontal closing position to close the opening A⁶. Now by the operator bearing down on the end of the closing disk H on which the spring I is fastened, a swinging motion is given to the closing disk H, so as to swing the same nearly into a vertical position, as plainly indicated in Fig. 5, whereby the operator can take hold of the closing disk H and the yoke G³ to turn the screw plug G′, with a view to screw the plug in or out of engagement with the nipple C². From the bottom of the screw plug G′ depends a chain J, carrying at its lower end a retaining bar J′, adapted to be seated against the under side of the nipple C² at the time the screw plug G′ is unscrewed and moved into a raised position, as indicated in dotted lines in Fig. 4, to permit of suspending the hot water vessel or bottle from a nail or other suitable fixed support, engaged by the yoke G³. Lugs G⁶ on the yoke G³ limit the swinging motion of the closing disk H, so that the disk H is properly supported in a horizontal position, as will be readily understood by reference to Fig. 5.

The discharging device D, shown in detail in Figs. 6 and 7, consists essentially of a threaded casing D′ rising from the bottom A² at an opening A⁷, and the said casing D′ is adapted to receive a screw plug K for closing the said casing. From the top of the casing D′ depends a nipple D², having one or more filling openings D³ near its open bottom, and the said nipple D² is provided with an annular retaining ridge or a shoulder D⁴, to retain a rubber irrigating tube in position on the said nipple D². The plug K is provided with a nipple K′ for receiving the nipple D² whenever the plug K is screwed in place, and the plug is provided with a washer N, adapted to be seated against the under side of the top of the chamber D′, to form a tight joint between the plug and the casing with a view to prevent leakage. When the hollow body A is filled with water and the plug K is removed from the chamber D′, and an irrigating tube is connected with the nipple D², then the water under a head or pressure can pass through the irrigating tube to a desired part of the body.

In order to completely drain the hollow body of water use is made of a siphon O, attached to the casing D′ within the body A, the short leg of the siphon O extending within the body A, while the long leg extends into the nipple D², as plainly indicated in Fig. 6.

The bottle cannot very well be completely filled with water through the filling device C, and in order to permit of completely filling the bottle, the latter, after being partly filled through the filling device C and after closing the filling device, is turned up-side down, and then the cap K is removed, to allow complete filling of the bottle, pouring the water into the casing D′ from which the water flows by way of the inlet opening D³ into the nipple D and into the bottle, the siphon O then serving as an air vent.

From the foregoing, it will be seen that the device can be used as a hot water vessel or bottle for containing hot water and for contact of any one of the sides, top or bottom with a part of the human body, to heat the same, and the device can also be used for irrigating purposes by attaching an irrigating tube to the nipple D² at the time the screw plug K is removed.

When using the device for irrigating purposes, the screw plug G′ is removed from the nipple C² and is attached to a nail or other support, to support the vessel overhead and thus give the desired head or pressure to the water flowing out of the irrigating tube.

Having thus described my invention, I claim as new and desire to secure by Letters Patent:

1. A hot water vessel having a hollow body made of metal and provided with a flat top, a flat bottom, a concave side and converging convex sides, a single layer of a heat-insulating material for one side, a double layer of heat-insulating material on another side, and a covering of soft fabric material for the said sides and their layers of insulating material.

2. A hot water vessel, comprising a vessel having a casing projecting into it, said casing being open at the top and its inner end reduced, a plug for closing the reduced inner end of the casing, and a closure carried by the plug for the outer enlarged end of the said casing.

3. A hot water vessel, comprising a metallic vessel having a flat top provided with an opening, and a filling device at the said opening for filling the vessel with water, the filling device having a casing open at the top and depending from the under side thereof to extend within the vessel, a threaded nipple extending from the bottom of the casing, a plug screwing in the said nipple, and a closure carried by the plug for the top opening of the casing.

4. A hot water vessel, comprising a metallic vessel having a flat top provided with an opening and a filling device at the said opening for filling the vessel with water, the filling device having a casing open at the top and depending from the under side thereof to extend within the vessel, a threaded nipple extending from the bottom of the casing, a plug screwing in the said nipple, a yoke extending upward from the said plug, and a spring-pressed plate fulcrumed on the said yoke for closing the top opening and for forming a handle to manipulate the plug.

5. A hot water vessel, comprising a vessel having a casing depending from its top, said casing being open at the top and having an opening in its bottom, a closure for the bottom opening of the casing, a closure for the top of the casing, and a connection between the closures.

6. A hot water vessel, comprising a vessel having a casing depending from its top, said casing being open at the top and having a nipple projecting from its bottom, a plug for closing the said nipple, and a pivoted closure carried by the plug for the top of the casing.

7. A hot water vessel, comprising a metallic vessel having a flat bottom provided with an opening, and a discharging device at the said bottom opening extending within the said vessel, the said discharging device having a casing extending upward from the bottom at the opening thereof, the top of the casing having an outlet nipple depending from the center thereof for engagement with an irrigation tube.

8. A hot water vessel, comprising a metallic vessel having a flat bottom provided with an opening, and a discharging device at the said bottom opening and extending within the said vessel, the said discharging device having a casing extending upward from the bottom at the opening thereof, the top of the casing having a depending outlet nipple for engagement with an irrigation tube, and a siphon attached to the said casing and having one leg extending in the hollow body and the other in the outlet nipple.

9. A hot water vessel, comprising a metallic vessel having a flat bottom provided with an opening, and a discharging device at the said bottom opening and extending within the said vessel, the said discharging device having a casing extending upward from the bottom at the opening thereof, the top of the casing having a depending outlet nipple for engagement with an irrigation tube, and a cap screwing into the said casing and having a chamber for inclosing the said nipple.

10. A combined hot water vessel and irrigator, comprising a hollow body having a flat top, a flat bottom, and concave and convex sides, a filling device depending from the said top to extend wholly within the said hollow body, and a discharging device rising from the said bottom to extend wholly within the said body, said discharge device comprising a casing having a nipple depending from the center of the top of the casing and terminating short of the outer face of the bottom of the vessel.

11. A combined hot water vessel and irrigator, comprising a hollow body having a flat top, a flat bottom and concave and convex sides, a filling device depending from the said top to extend wholly within the said hollow body, and a discharging device rising from the said bottom to extend wholly within the said body and having a siphon.

In testimony whereof I have signed my name to this specification in the presenc of two subscribing witnesses.

SILAS WOODSON LONGAN.

Witnesses:
WM. R. BLAKEMORE,
ROBERT E. SHEA.

---

Copies of this patent may be obtained for five cents each, by addressing the "Commissioner of Patent Washington, D. C."